United States Patent
Lee

(10) Patent No.: US 10,571,653 B2
(45) Date of Patent: Feb. 25, 2020

(54) OPTICAL IMAGING SYSTEM

(71) Applicant: SAMSUNG ELECTRO-MECHANICS CO., LTD., Suwon-si (KR)

(72) Inventor: Tae Youn Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 177 days.

(21) Appl. No.: 15/084,978

(22) Filed: Mar. 30, 2016

(65) Prior Publication Data

US 2017/0108662 A1    Apr. 20, 2017

(30) Foreign Application Priority Data

Oct. 19, 2015   (KR) .................. 10-2015-0145259

(51) Int. Cl.
| | |
|---|---|
| G02B 9/64 | (2006.01) |
| G02B 5/00 | (2006.01) |
| G02B 5/20 | (2006.01) |
| G02B 7/04 | (2006.01) |
| G02B 13/18 | (2006.01) |

(52) U.S. Cl.
CPC ............. *G02B 9/64* (2013.01); *G02B 5/005* (2013.01); *G02B 5/208* (2013.01); *G02B 7/04* (2013.01); *G02B 13/18* (2013.01)

(58) Field of Classification Search
CPC ...... G02B 13/0045; G02B 9/64; G02B 5/005; G02B 5/208; G02B 7/04; G02B 13/04; G02B 13/18
USPC .......................................... 359/646, 691–692
See application file for complete search history.

(56) References Cited

U.S. PATENT DOCUMENTS

| | | | | |
|---|---|---|---|---|
| 4,173,395 | A * | 11/1979 | Kobayashi | G02B 13/04 359/750 |
| 4,759,619 | A * | 7/1988 | Nakamura | G02B 13/04 359/749 |
| 8,094,385 | B2 * | 1/2012 | Sueyoshi | G02B 13/04 359/717 |
| 8,385,008 | B2 | 2/2013 | Hsieh et al. | |
| 8,736,979 | B2 | 5/2014 | Tsai et al. | |
| 8,780,464 | B2 | 7/2014 | Huang | |
| 9,110,271 | B2 | 8/2015 | Sekine | |
| 9,523,841 | B1 * | 12/2016 | Chen | G02B 13/0045 |

(Continued)

FOREIGN PATENT DOCUMENTS

| | | |
|---|---|---|
| CN | 202067014 U | 12/2011 |
| CN | 202886713 U | 4/2013 |

(Continued)

OTHER PUBLICATIONS

Korean Office Action dated Sep. 13, 2017 in corresponding Korean Patent Application No. 10-2015-0145259 (8 pages with English translation).

(Continued)

*Primary Examiner* — Joseph P Martinez
*Assistant Examiner* — Vipin Patel
(74) *Attorney, Agent, or Firm* — NSIP Law

(57) ABSTRACT

An optical imaging system includes a first lens group and a second lens group. The first lens group includes a first lens and a second lens. The second lens group includes a third lens, a fourth lens, a fifth lens, a sixth lens, and a seventh lens. The first to seventh lenses are sequentially disposed from an object side toward an imaging plane. The optical imaging system satisfies TTL/2Y<1.3, where TTL is a distance from an object-side surface of the first lens to the imaging plane, and 2Y is a diagonal length of the imaging plane.

17 Claims, 20 Drawing Sheets

(56) References Cited

U.S. PATENT DOCUMENTS

| | | | | |
|---|---|---|---|---|
| 2012/0147485 A1* | 6/2012 | Kubota | ............... | G02B 9/62 359/794 |
| 2012/0212836 A1 | 8/2012 | Hsieh et al. | | |
| 2014/0043694 A1* | 2/2014 | Tsai | ............... | G02B 3/04 359/708 |
| 2014/0071333 A1* | 3/2014 | Kanetaka | ............... | G02B 9/34 348/360 |
| 2014/0285902 A1* | 9/2014 | Chang | ............... | G02B 15/177 359/689 |
| 2014/0376105 A1* | 12/2014 | Sekine | ............... | G02B 3/04 359/708 |
| 2015/0022908 A1 | 1/2015 | Tomioka | | |
| 2016/0033743 A1* | 2/2016 | Chen | ............... | G02B 13/0045 359/708 |

FOREIGN PATENT DOCUMENTS

| | | |
|---|---|---|
| CN | 204028445 U | 12/2014 |
| CN | 106443987 A | 2/2017 |
| JP | 2015-004842 A | 1/2015 |
| JP | 5671190 B2 | 2/2015 |
| JP | 2015-072404 A | 4/2015 |
| KR | 2011-0071807 A | 6/2011 |

OTHER PUBLICATIONS

Korean Office Action dated Apr. 24, 2017 in corresponding Korean patent application No. 10-2015-0145259 (8 pages with English translation).

Chinese Office Action dated Jun. 22, 2018 in corresponding Chinese Patent Application No. 201610274033.4 (7 pages in English and 6 pages in Chinese).

Chinese Office Action dated Feb. 25, 2019 in corresponding Chinese Patent Application No. 201610274033.4 (11 pages in English and 8 pages in Chinese).

Chinese Office Action dated Sep. 2, 2019 in corresponding Chinese Patent Application No. 201610274033.4 (6 pages in English and 6 pages in Chinese).

* cited by examiner

FIRST EXEMPLARY EMBODIMENT

FOV = 67.00   TTL = 7.78   f = 2.511

| SURFACE NO. | | RADIUS OF CURVATURE | THICKNESS /DISTANCE | FOCAL LENGTH | REFRACTIVE INDEX | ABBE NUMBER |
|---|---|---|---|---|---|---|
| 1 | FIRST LENS | -1000.0000 | 0.6000 | -3.948 | 1.487 | 70.440 |
| 2 | | 1.9350 | 1.1670 | | | |
| 3 | SECOND LENS (STOP) | 3.4980 | 0.7240 | 4.690 | 1.544 | 56.090 |
| 4 | | -8.8830 | 0.3730 | | | |
| 5 | THIRD LENS | -4.5560 | 0.2400 | -8.698 | 1.643 | 22.400 |
| 6 | | -24.0380 | 0.0400 | | | |
| 7 | FOURTH LENS | -53.4890 | 0.5530 | 3.733 | 1.544 | 56.090 |
| 8 | | -1.9720 | 0.3100 | | | |
| 9 | FIFTH LENS | 8.5910 | 0.6870 | 6.809 | 1.544 | 56.090 |
| 10 | | -5.1650 | 0.5770 | | | |
| 11 | SIXTH LENS | 6.6760 | 0.5000 | -2.793 | 1.643 | 22.400 |
| 12 | | 1.3840 | 0.1390 | | | |
| 13 | SEVENTH LENS | 1.0460 | 0.7530 | 4.339 | 1.535 | 55.710 |
| 14 | | 1.4190 | 0.3500 | | | |
| 15 | FILTER | infinity | 0.1100 | | 1.517 | 64.200 |
| 16 | | infinity | 0.6560 | | | |
| 17 | IMAGING PLANE | infinity | | | | |

FIG. 3

| SURFACE NO. | K | A | B | C | D | E | F | G | H |
|---|---|---|---|---|---|---|---|---|---|
| 3 | -26.29000 | 0.09092 | -0.05304 | 0.02902 | -0.01290 | | | | |
| 6 | 99.00000 | 0.24274 | -0.83676 | -0.63139 | 6.95666 | -13.28480 | 26.98840 | -33.62390 | |
| 7 | 99.00000 | 0.21764 | -1.21571 | 4.37133 | -24.86910 | 88.92270 | -145.43500 | 87.65760 | |
| 8 | 2.07900 | -0.05399 | -0.09706 | 0.85713 | -3.57765 | 7.17909 | -7.09118 | 2.67740 | |
| 9 | 78.96000 | -0.09499 | 0.09187 | -0.29461 | 0.94201 | -1.88543 | 1.89944 | -0.76619 | |
| 10 | 15.36000 | -0.10287 | -0.03685 | 0.23125 | -0.40589 | 0.38808 | -0.20291 | 0.04764 | |
| 11 | -62.52000 | -0.15549 | -0.02173 | 0.03481 | -0.35635 | 0.88386 | -0.99381 | 0.52163 | -0.10358 |
| 12 | -18.76000 | 0.02668 | -0.15963 | 0.14424 | -0.04503 | -0.01016 | 0.01079 | -0.00267 | 0.00022 |
| 13 | -8.37300 | -0.05175 | -0.07737 | 0.11932 | -0.07267 | 0.02378 | -0.00438 | 0.00043 | -0.00002 |
| 14 | -4.38500 | -0.09893 | 0.00303 | 0.03762 | -0.02373 | 0.00681 | -0.00104 | 0.00008 | 0.00000 |

FIG. 4

SECOND EXEMPLARY EMBODIMENT

| FOV ≈ | 59.20 | TTL ≈ | 7.31 | f ≈ | 2.823 | |
|---|---|---|---|---|---|---|
| SURFACE NO. | | RADIUS OF CURVATURE | THICKNESS /DISTANCE | FOCAL LENGTH | REFRACTIVE INDEX | ABBE NUMBER |
| 1 | FIRST LENS | 12.4990 | 0.5000 | -4.898 | 1.487 | 70.440 |
| 2 | | 1.9840 | 0.7860 | | | |
| 3 | SECOND LENS (STOP) | 3.7900 | 0.7500 | 5.051 | 1.544 | 56.090 |
| 4 | | -9.4520 | 0.3080 | | | |
| 5 | THIRD LENS | -4.2270 | 0.2400 | -8.218 | 1.643 | 22.400 |
| 6 | | -20.7650 | 0.0400 | | | |
| 7 | FOURTH LENS | -35.9600 | 0.5790 | 3.761 | 1.544 | 56.090 |
| 8 | | -1.9550 | 0.2550 | | | |
| 9 | FIFTH LENS | 8.8890 | 0.7450 | 6.078 | 1.544 | 56.090 |
| 10 | | -5.1470 | 0.5910 | | | |
| 11 | SIXTH LENS | 4.6770 | 0.5000 | -3.067 | 1.643 | 22.400 |
| 12 | | 1.3380 | 0.2140 | | | |
| 13 | SEVENTH LENS | 1.0340 | 0.6800 | 4.798 | 1.535 | 55.710 |
| 14 | | 1.3290 | 0.2720 | | | |
| 15 | FILTER | infinity | 0.1100 | | 1.517 | 64.200 |
| 16 | | infinity | 0.7400 | | | |
| 17 | IMAGING PLANE | infinity | | | | |

FIG. 7

| SURFACE NO. | K | A | B | C | D | E | F | G | H |
|---|---|---|---|---|---|---|---|---|---|
| 3 | -26.29000 | 0.07284 | -0.03776 | 0.01213 | -0.00531 | | | | |
| 4 | 37.45000 | 0.08109 | -0.12745 | 0.06335 | -0.01252 | | | | |
| 6 | 99.00000 | 0.36519 | -1.80299 | 0.89921 | 12.70660 | -32.45670 | 28.84130 | -6.24933 | |
| 7 | 99.00000 | 0.30994 | -1.91273 | 4.46995 | -9.46468 | 31.03500 | -61.21420 | 43.28490 | |
| 8 | 1.89300 | -0.06969 | 0.07384 | -0.08525 | -0.17640 | 0.72196 | -0.77502 | 0.03944 | |
| 9 | 82.21000 | -0.12635 | 0.20333 | -0.68062 | 1.66753 | -2.53549 | 2.07421 | -0.73204 | |
| 10 | 16.34000 | -0.10558 | 0.03969 | -0.03438 | 0.04784 | -0.03998 | 0.01707 | -0.00389 | |
| 11 | -62.52000 | -0.18541 | 0.40220 | -1.55264 | 3.16282 | -3.75713 | 2.58626 | -0.96194 | 0.14960 |
| 12 | -18.76000 | 0.02378 | -0.20045 | 0.25783 | -0.18229 | 0.07711 | -0.01945 | 0.00270 | -0.00016 |
| 13 | -7.62100 | -0.12237 | 0.03522 | -0.01766 | 0.01306 | -0.00538 | 0.00118 | -0.00013 | 0.00001 |
| 14 | -4.15700 | -0.18179 | 0.17055 | -0.09796 | 0.03264 | -0.00655 | 0.00079 | -0.00005 | 0.00000 |

FIG. 8

THIRD EXEMPLARY EMBODIMENT

FOV = 59.00    TTL = 7.62    f = 2.691

| SURFACE NO. | | RADIUS OF CURVATURE | THICKNESS /DISTANCE | FOCAL LENGTH | REFRACTIVE INDEX | ABBE NUMBER |
|---|---|---|---|---|---|---|
| 1 | FIRST LENS | 34.1400 | 0.6000 | -3.549 | 1.487 | 70.440 |
| 2 | | 1.6420 | 0.9970 | | | |
| 3 | SECOND LENS | 3.7720 | 0.7500 | 4.830 | 1.544 | 56.090 |
| 4 | | -8.1770 | 0.6380 | | | |
| 5 | STOP | infinity | -0.0530 | | | |
| 6 | | | D1 | | | |
| 7 | THIRD LENS | 1.9520 | 0.5820 | 3.322 | 1.544 | 56.090 |
| 8 | | -23.1610 | 0.0400 | | | |
| 9 | FOURTH LENS | -42.5760 | 0.2400 | -5.449 | 1.643 | 22.400 |
| 10 | | 3.8680 | 0.1630 | | | |
| 11 | FIFTH LENS | 8.5520 | 0.7270 | 6.078 | 1.544 | 56.090 |
| 12 | | -5.2680 | 0.5110 | | | |
| 13 | SIXTH LENS | 3.7910 | 0.5000 | -4.182 | 1.643 | 22.400 |
| 14 | | 1.5000 | 0.1960 | | | |
| 15 | SEVENTH LENS | 1.0950 | 0.6660 | 4.773 | 1.535 | 55.710 |
| 16 | | 1.5040 | 0.2090 | | | |
| 17 | FILTER | infinity | 0.1100 | | 1.517 | 64.200 |
| 18 | | infinity | 0.7400 | | | |
| 19 | IMAGING PLANE | infinity | D2 | | | |

FIG. 11

| SURFACE NO. | K | A | B | C | D | E | F | G | H |
|---|---|---|---|---|---|---|---|---|---|
| 3 | -26.29000 | 0.06557 | -0.03427 | 0.01485 | -0.00587 | | | | |
| 4 | 23.62000 | 0.03135 | -0.01584 | -0.00603 | 0.00181 | | | | |
| 7 | 1.15100 | 0.03252 | 0.12489 | -1.30496 | 5.99034 | -15.49990 | 21.42510 | -12.30360 | |
| 8 | 99.00000 | -0.06191 | 0.49281 | -1.76243 | -1.27741 | 20.16220 | -36.95970 | 19.89900 | |
| 9 | 99.00000 | -0.11915 | 0.64210 | -2.03226 | -0.85572 | 19.68060 | -36.56400 | 19.82170 | |
| 10 | 18.32000 | -0.10350 | 0.50093 | -1.54665 | 2.63038 | -1.70066 | -0.05171 | 0.00000 | |
| 11 | 87.54000 | -0.13315 | 0.19329 | -0.45842 | 0.83663 | -1.64392 | 2.17652 | -1.11983 | |
| 12 | 18.09000 | -0.11140 | 0.03854 | -0.02068 | -0.01057 | 0.02908 | -0.04407 | 0.02437 | |
| 13 | -62.52000 | -0.04448 | -0.06688 | -0.13066 | 0.56419 | -0.90608 | 0.73928 | -0.31127 | 0.05330 |
| 14 | -18.76000 | -0.07016 | 0.02555 | -0.02085 | 0.01667 | -0.01015 | 0.00350 | -0.00059 | 0.00004 |
| 15 | -7.67400 | -0.17179 | 0.07816 | -0.04118 | 0.01875 | -0.00492 | 0.00070 | -0.00005 | 0.00000 |
| 16 | -3.90900 | -0.18486 | 0.13746 | -0.05914 | 0.01062 | 0.00048 | -0.00048 | 0.00007 | 0.00000 |

FIG. 12

FOURTH EXEMPLARY EMBODIMENT

FOV = 67.00  TTL = 7.33  f = 2.705

| SURFACE NO. | | RADIUS OF CURVATURE | THICKNESS /DISTANCE | FOCAL LENGTH | REFRACTIVE INDEX | ABBE NUMBER |
|---|---|---|---|---|---|---|
| 1 | FIRST LENS | infinity | 0.6000 | -4.571 | 1.487 | 70.440 |
| 2 | | 2.2360 | 0.7080 | | | |
| 3 | SECOND LENS (STOP) | 3.8220 | 0.7500 | 4.985 | 1.544 | 56.090 |
| 4 | | -8.8320 | 0.3180 | | | |
| 5 | THIRD LENS | -4.1060 | 0.2400 | -8.435 | 1.643 | 22.400 |
| 6 | | -16.7630 | 0.0400 | | | |
| 7 | FOURTH LENS | -25.2030 | 0.5610 | 3.838 | 1.544 | 56.090 |
| 8 | | -1.9520 | 0.2120 | | | |
| 9 | FIFTH LENS | 8.7450 | 0.7440 | 6.032 | 1.544 | 56.090 |
| 10 | | -5.1320 | 0.6230 | | | |
| 11 | SIXTH LENS | 5.1080 | 0.5000 | -2.644 | 1.643 | 22.400 |
| 12 | | 1.2360 | 0.1590 | | | |
| 13 | SEVENTH LENS | 0.9490 | 0.7450 | 3.297 | 1.535 | 55.710 |
| 14 | | 1.4840 | 0.2770 | | | |
| 15 | FILTER | infinity | 0.1100 | | 1.517 | 64.200 |
| 16 | | infinity | 0.7460 | | | |
| 17 | IMAGING PLANE | infinity | | | | |

FIG. 15

| SURFACE NO. | K | A | B | C | D | E | F | G | H |
|---|---|---|---|---|---|---|---|---|---|
| 3 | -26.29000 | 0.07806 | -0.03649 | 0.01156 | -0.00599 | 0.00000 | 0.00000 | 0.00000 | |
| 4 | 30.68000 | 0.07910 | -0.11625 | 0.05083 | -0.00848 | 0.00000 | 0.00000 | 0.00000 | |
| 6 | 99.00000 | 0.33382 | -1.76740 | 2.76863 | -0.09100 | 7.64213 | -35.71900 | 36.10230 | 0.00000 |
| 7 | 99.00000 | 0.31380 | -2.06835 | 7.17241 | -25.63020 | 79.77630 | -137.85800 | 92.39540 | 0.00000 |
| 8 | 1.73700 | -0.06354 | 0.09582 | -0.28096 | 0.70886 | -1.37103 | 1.72530 | -1.16328 | 0.00000 |
| 9 | 83.89000 | -0.12741 | 0.20291 | -0.70340 | 1.85324 | -3.02156 | 2.64666 | -0.98824 | 0.00000 |
| 10 | 16.90000 | -0.10308 | -0.04057 | 0.17588 | -0.28342 | 0.25904 | -0.12129 | 0.02269 | 0.00000 |
| 11 | -62.52000 | -0.14841 | 0.23451 | -1.03154 | 2.12509 | -2.49366 | 1.64347 | -0.57317 | 0.08319 |
| 12 | -18.76000 | 0.03240 | -0.23712 | 0.33388 | -0.25082 | 0.10906 | -0.02766 | 0.00382 | -0.00022 |
| 13 | -8.55800 | -0.04815 | -0.10361 | 0.12397 | -0.06438 | 0.01884 | -0.00321 | 0.00030 | -0.00001 |
| 14 | -4.06300 | -0.15203 | 0.15489 | -0.09781 | 0.03419 | -0.00684 | 0.00078 | -0.00005 | 0.00000 |

FIG. 16

| FIFTH EXEMPLARY EMBODIMENT ||||||
|---|---|---|---|---|---|
| FOV = | 65.00 | TTL = | 7.53 | f = | 2.840 |

| SURFACE NO. | | RADIUS OF CURVATURE | THICKNESS /DISTANCE | FOCAL LENGTH | REFRACTIVE INDEX | ABBE NUMBER |
|---|---|---|---|---|---|---|
| 1 | FIRST LENS | -500.0000 | 0.5000 | -3.909 | 1.544 | 56.090 |
| 2 | | 2.1460 | 0.7080 | | | |
| 3 | SECOND LENS (STOP) | 3.8240 | 0.7410 | 4.812 | 1.544 | 56.090 |
| 4 | | -7.8440 | 0.3290 | | | |
| 5 | THIRD LENS | -3.8730 | 0.2410 | -7.643 | 1.643 | 22.400 |
| 6 | | -18.0530 | 0.0400 | | | |
| 7 | FOURTH LENS | -27.8990 | 0.5740 | 3.804 | 1.544 | 56.090 |
| 8 | | -1.9490 | 0.1890 | | | |
| 9 | FIFTH LENS | 8.8040 | 0.8330 | 6.068 | 1.544 | 56.090 |
| 10 | | -5.1430 | 0.6900 | | | |
| 11 | SIXTH LENS | 5.7010 | 0.5070 | -13.920 | 1.643 | 22.400 |
| 12 | | 3.3740 | 0.1730 | | | |
| 13 | SEVENTH LENS | 2.3240 | 0.6660 | -14.428 | 1.535 | 55.710 |
| 14 | | 1.6090 | 0.2730 | | | |
| 15 | FILTER | infinity | 0.1100 | | 1.517 | 64.200 |
| 16 | | infinity | 0.9510 | | | |
| 17 | IMAGING PLANE | infinity | | | | |

FIG. 19

| SURFACE NO. | K | A | B | C | D | E | F | G | H |
|---|---|---|---|---|---|---|---|---|---|
| 2 | -0.00433 | -0.00022 | -0.00007 | -0.00001 | 0.00001 | | | | |
| 3 | -26.29000 | 0.07045 | -0.02036 | -0.01292 | 0.02099 | -0.01512 | 0.00412 | -0.00046 | |
| 4 | 24.21000 | 0.05787 | -0.07981 | 0.03228 | -0.00514 | | | | |
| 6 | 99.00000 | 0.31597 | -1.64334 | 3.49820 | -10.87160 | 51.60880 | -112.73500 | 84.84940 | |
| 7 | 99.00000 | 0.30321 | -1.83102 | 6.62296 | -30.71970 | 107.96800 | -188.84900 | 124.32500 | |
| 8 | 1.72200 | -0.07983 | 0.33154 | -1.84295 | 6.55497 | -14.21620 | 16.93770 | -8.39648 | |
| 9 | 84.53000 | -0.13177 | 0.21948 | -0.62093 | 1.27119 | -1.74868 | 1.38256 | -0.49275 | |
| 10 | 17.09000 | -0.10655 | -0.09819 | 0.47669 | -0.89573 | 0.89817 | -0.46861 | 0.10126 | |
| 11 | -62.52000 | -0.07747 | -0.15653 | 0.09524 | 0.14788 | -0.37413 | 0.30627 | -0.11934 | 0.01915 |
| 12 | -18.76000 | 0.04003 | -0.16691 | 0.18263 | -0.11287 | 0.04140 | -0.00897 | 0.00107 | -0.00005 |
| 13 | -5.21500 | -0.08809 | -0.00036 | 0.02993 | -0.01763 | 0.00489 | -0.00074 | 0.00006 | 0.00000 |
| 14 | -3.57900 | -0.09378 | 0.01104 | 0.01928 | -0.01318 | 0.00394 | -0.00063 | 0.00005 | 0.00000 |

FIG. 20

OPTICAL IMAGING SYSTEM

CROSS-REFERENCE TO RELATED APPLICATION(S)

This application claims the benefit under 35 USC 119(a) of Korean Patent Application No. 10-2015-0145259, filed on Oct. 19, 2015 in the Korean Intellectual Property Office, the entire disclosure of which is incorporated herein by reference for all purposes.

BACKGROUND

1. Field

The following description relates to an optical imaging system including seven lenses.

2. Description of Related Art

A monitoring camera for an unmanned aerial vehicle that monitors a wide region and distance from the monitoring camera to a target is significantly large in size. The monitoring camera requires an optical imaging system that has a wide field of view to achieve high resolution. Similarly, to photograph the front and rear areas of a vehicle moving relatively fast with a monitoring camera requires an optical imaging system with a high resolution.

An optical imaging system formed of glass can achieve a camera having a high level of resolution. However, the optical imaging system formed of glass weighs significantly more than an optical imaging system formed of plastic. Therefore, it is difficult to mount the optical imaging system formed of glass in a small unmanned aerial vehicle, a small terminal, or the like.

Conversely, an optical imaging system formed of plastic may be lighter than one formed of glass. However, the optical imaging system formed of plastic has a lower resolution level than that of the optical imaging system formed of glass. Therefore, there is a need for a lightened optical imaging system capable of having a high resolution level.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens group and a second lens group. The first lens group includes a first lens and a second lens. The second lens group includes a third lens, a fourth lens, a fifth lens, a sixth lens, and a seventh lens. The first to seventh lenses are sequentially disposed from an object side toward an imaging plane. The optical imaging system satisfies TTL/2Y<1.3, where TTL is a distance from an object-side surface of the first lens to the imaging plane, and 2Y is a diagonal length of the imaging plane.

The second lens group may be movable in an optical axis direction.

The first lens may have a negative refractive power.
The second lens may have a positive refractive power.
The third lens may have a negative refractive power.
The fourth lens may have a positive refractive power.
The fifth lens may have a positive refractive power.
The sixth lens may have a negative refractive power.
The seventh may have has a positive refractive power.

The optical imaging system may satisfy $-80<\{(1/f)*(Y/\tan\theta)-1\}*100<-20$, where f is an overall focal length of the optical imaging system, Y is ½ of a diagonal length of the imaging plane, and $\theta$ is a half of a field of view of the optical imaging system.

The optical imaging system may satisfy $1.0<\tan\theta<4.0$, where $\theta$ is a half of a field of view of the optical imaging system.

The optical imaging system may satisfy $0.4<R2/f<1.5$, where f is an overall focal length of the optical imaging system, and R2 is a radius of curvature of an image-side surface of the first lens.

The optical imaging system may satisfy $-1.5<f/f1<-0.05$, where f is an overall focal length of the optical imaging system, and f1 is a focal length of the first lens.

The optical imaging system may satisfy $0.3<f/f2<0.8$, where f is an overall focal length of the optical imaging system, and f2 is a focal length of the second lens.

In another general aspect, an optical imaging system includes a first lens having a negative refractive power, a second lens having a positive refractive power, a third lens having a refractive power, a fourth lens having a refractive power, a fifth lens having positive a refractive power, a sixth lens having a negative refractive power and an object-side surface thereof being convex, and a seventh lens having a refractive power and having an inflection point formed on an image-side surface thereof. The first to seventh lenses are sequentially disposed from an object side toward an imaging plane.

Both surfaces of the second lens may be convex.

In another general aspect, an optical imaging system includes a first and second lens groups. The first and second lens groups is sequentially disposed from an object side toward an imaging plane. The first lens group is fixedly disposed at the object-side. The second lens group is slidably disposed relative to the first group. The optical imaging system satisfies $0.4<f/fG2<1.1$, where f is an overall focal length of the optical imaging system and fG2 is a synthetic focal length of the second lens group.

The optical imaging system may satisfy $-80<\{(1/f)*(Y/\tan\theta)-1\}*100<-20$, where f is an overall focal length of the optical imaging system, 2Y is a diagonal length of the imaging plane, and $\theta$ is half of a field of view of the optical imaging system.

The first group of lens may include a first lens and a second lens.

The second group of lens may include a third lens, a fourth lens, a fifth lens, a sixth lens, and a seventh lens.

Other features and aspects will be apparent from the following detailed description, the drawings, and the claims.

BRIEF DESCRIPTION OF DRAWINGS

FIG. 3 is a table of an example of characteristics of lenses of the optical imaging system illustrated in FIG. 1.

FIG. 4 is a table of an example of aspherical characteristics of the optical imaging system illustrated in FIG. 1.

FIG. 7 is a table of an example of characteristics of lenses of the optical imaging system illustrated in FIG. 5.

FIG. 8 is a table of an example of aspherical characteristics of the optical imaging system illustrated in FIG. 5.

FIG. 11 is a table of an example of characteristics of lenses of the optical imaging system illustrated in FIG. 9.

FIG. 12 is a table of an example of aspherical characteristics of the optical imaging system illustrated in FIG. 9.

FIG. 15 is a table of an example of characteristics of lenses of the optical imaging system illustrated in FIG. 13.

FIG. 16 is a table of an example of aspherical characteristics of the optical imaging system illustrated in FIG. 13.

FIG. 19 is a table of an example of characteristics of lenses of the optical imaging system illustrated in FIG. 17.

FIG. 20 is a table of an example of aspherical characteristics of the optical imaging system illustrated in FIG. 17.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
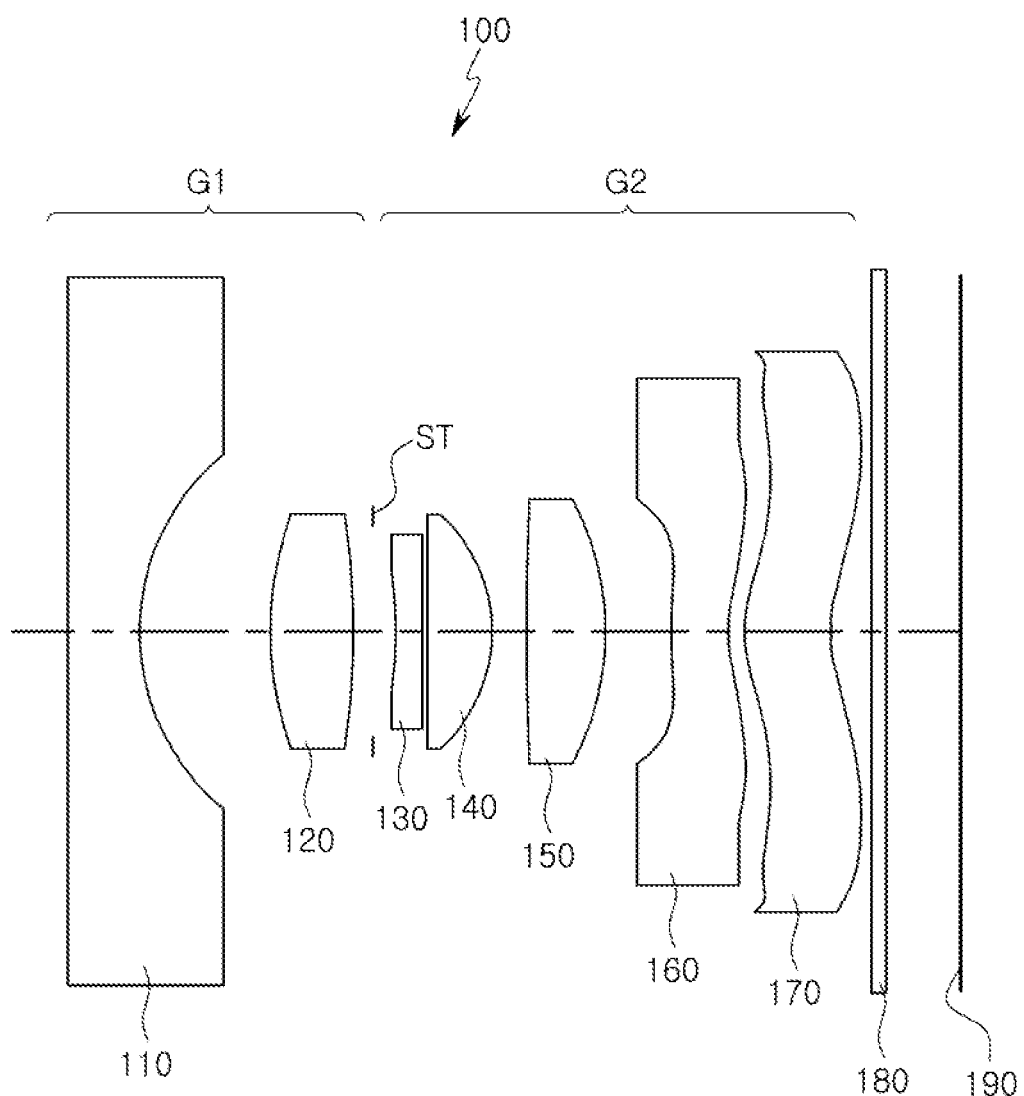
FIG. 1 is a diagram illustrating an example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures, for example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

As used herein, a first lens refers to a lens closest to an object (or a subject), while a seventh lens refers to a lens closest to an imaging plane (or an image sensor). In addition, all of radii of curvature and thicknesses of lenses, a TTL, an ImgH (½ of a diagonal length of the imaging plane), and focal lengths are represented by millimeters (mm). Further, thicknesses of the lenses, gaps between the lenses, and the TTL are distances in optical axes of the lenses. Further, in a description for shapes of the lenses, the meaning that one surface of a lens is convex is that an optical axis portion of a corresponding surface is convex, and the meaning that one surface of a lens is concave is that an optical axis portion of a corresponding surface is concave. Therefore, although it is described that one surface of a lens is convex, an edge portion of the lens may be concave. Likewise, although it is described that one surface of a lens is concave, an edge portion of the lens may be convex.

An optical imaging system may include an optical system including a plurality of lenses, for example, the optical system of the optical imaging system may include seven lenses having refractive power. However, the optical imaging system is not limited to including only the lenses having the refractive power, for example, the optical imaging system may include a stop for controlling an amount of light. In addition, the optical imaging system may further include an infrared cut-off filter filtering infrared light. Further, the optical imaging system may further include an image sensor (that is, an imaging device) converting an image of a subject incident thereto through the optical system into electrical signals. Further still, the optical imaging system may include a gap maintaining member adjusting a gap between lenses.

First to seventh lenses may be formed of materials having a refractive index different from that of air, for example, the first to seventh lenses may be formed of plastic or glass. At least one of the first to seventh lenses may have an aspherical shape. As an example, only the seventh lens of the first to seventh lenses may have the aspherical shape. In addition, at least one surface of all of the first to seventh lenses may be aspherical. Here, an aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}. \quad \text{[Equation 1]}$$

In Equation 1, c is the inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance Y and a tangential plane meeting the apex of the aspherical surface of the lens.

An optical imaging system may include seven lenses, a filter, an image sensor, and a stop. Next, the above-mentioned components will be described.

The first lens may have refractive power, for example, the first lens may have negative refractive power.

At least one surface of the first lens may be concave, for example, an image-side surface of the first lens may be concave.

The first lens may have a spherical surface, such as, both surfaces of the first lens being spherical. The first lens may be formed of a material having high light transmissivity and excellent workability, for example, the first lens may be formed of glass. However, a material of the first lens is not limited to glass and may be another material such as plastic.

The second lens may have refractive power, such as, the second lens having positive refractive power.

At least one surface of the second lens may be convex, for example, both surfaces of the second lens may be convex.

The second lens may have an aspherical surface, such as, an object-side surface of the second lens being aspherical. The second lens may be formed of a material having high light transmissivity and excellent workability, for example, the second lens may be formed of plastic. However, a material of the second lens is not limited to plastic and may be formed of other materials including glass.

The third lens may have refractive power, for instance, the third lens may have positive or negative refractive power.

One surface of the third lens may be convex, such as, an image-side surface of the third lens being convex.

The third lens may have an aspherical surface, for example, an image-side surface of the third lens may be aspherical. The third lens may be formed of a material having high light transmissivity and excellent workability, and may be formed of other materials including plastic. However, a material of the third lens is not limited to plastic and could be formed of glass.

The fourth lens may have refractive power, such as, the fourth lens having positive or negative refractive power.

The fourth lens may have a meniscus shape, for example, an object-side surface of the fourth lens may be concave.

The fourth lens may have an aspherical surface, such as, both surfaces of the fourth lens being aspherical. The fourth lens may be formed of a material having high light transmissivity and excellent workability, for example, like being formed of plastic. However, a material of the fourth lens is not limited to plastic and may be other materials including glass.

The fifth lens may have refractive power, for example, the fifth lens may have positive refractive power.

At least one surface of the fifth lens may be convex, for example, both surfaces of the fifth lens may be convex.

The fifth lens may have an aspherical surface, for example, both surfaces of the fifth lens may be aspherical. The fifth lens may be formed of a material having high light transmissivity and excellent workability, for example, the fifth lens may be formed of plastic. However, a material of the fifth lens is not limited to plastic, for example, the fifth lens may be formed of glass.

The sixth lens may have refractive power, for example, the sixth lens may have negative refractive power.

The sixth lens may have a meniscus shape, for example, an image-side surface of the sixth lens may be concave.

The sixth lens may have inflection points, for example, the inflection points may be formed on both surfaces of the sixth lens.

The sixth lens may have an aspherical surface, for example, both surfaces of the sixth lens may be aspherical. The sixth lens may be formed of a material having high light transmissivity and excellent workability, for example, the sixth lens may be formed of plastic. However, a material of the sixth lens is not limited to plastic, for example, the sixth lens may be formed of glass.

The seventh lens may have refractive power, for example, the seventh lens may have positive or negative refractive power.

The seventh lens may have a meniscus shape, for example, an image-side surface of the seventh lens may be concave.

The seventh lens may have inflection points, for example, the inflection points may be formed on both surfaces of the seventh lens.

The seventh lens may have an aspherical surface, for example, both surfaces of the seventh lens may be aspherical. The seventh lens may be formed of a material having high light transmissivity and excellent workability, for example, the seventh lens may be formed of plastic. However, a material of the seventh lens is not limited to plastic, for example, the seventh lens may be formed of glass.

The lenses of the optical imaging system configured as described above may be grouped into two lens groups, for example, the first lens and the second lens may form a first lens group, and the third to seventh lenses may form a second lens group. The first lens group may be fixed to an object side. The second lens group may be movable, for example, the second lens group may move between the first lens group and the imaging plane in order to focus the lenses.

The filter may filter a partial wavelength from light incident through the first to seventh lenses, for example, the filter may filter infrared wavelengths of the incident light.

The thickness of the filter may be reduced during manufacturing by being formed of plastic.

The image sensor may be configured to have a high resolution, for example, a unit size of pixels configuring the image sensor may be 1.12 μm or less.

The stop may be positioned to adjust the amount of light incident on the lenses, for example, the stop may be disposed between the second and third lenses.

The optical imaging system may satisfy the following Conditional Expressions:

| | |
|---|---|
| $-80<\{(1/f)*(Y/\tan\theta)-1\}*100<-20$ | [Conditional Expression] |
| $TTL/2Y<1.3$ | [Conditional Expression] |
| $1.0<\tan\theta<4.0$ | [Conditional Expression] |
| $0.4<R2/f<1.5$ | [Conditional Expression] |
| $-1.5<f/f1<-0.05$ | [Conditional Expression] |
| $0.3<f/f2<0.8$ | [Conditional Expression] |
| $1.5<f/EPD<3.2$ | [Conditional Expression] |
| $0.4<f/fG2<1.1.$ | [Conditional Expression] |

Here, f is an overall focal length of the optical imaging system, 2Y is a diagonal length of the imaging plane, Y is ½ of 2Y, θ is half of a field of view of the optical imaging system, R2 is a radius of curvature of the image-side surface of the first lens, f1 is a focal length of the first lens, f2 is a focal length of the second lens, EPD is an entrance pupil diameter, and fG2 is a synthetic focal length of the second lens group.

The optical imaging system satisfying the above Conditional Expressions may be miniaturized, and may realize high resolution.

Next, optical imaging systems according to several embodiments will be described.

First, an optical imaging system according to an embodiment will be described with reference to FIG. 1.

The optical imaging system 100 includes an optical system including a first lens 110, a second lens 120, a third lens 130, a fourth lens 140, a fifth lens 150, a sixth lens 160, and a seventh lens 170.

In the configurations of the lenses as described above, the first lens 110 and the second lens 120 form a first lens group G1, and the third to seventh lenses 130 to 170 form a second lens group G2.

The optical imaging system 100 includes a filter 180, an image sensor 190, and a stop ST. The filter 180 is disposed adjacently to an image-side surface of the seventh lens 170, and the stop ST is disposed between the second lens 120 and the third lens 130.

In the present embodiment, the first lens 110 has a negative refractive power. An object-side and image-side surfaces of the first lens 110 are concave. The second lens 120 has a positive refractive power, and both surfaces are convex. The third lens 130 has a negative refractive power. An object-side surface of third lens 130 is concave and the image-side surface is convex. The fourth lens 140 has a positive refractive power. An object-side surface of the fourth lens 140 is concave and an image-side surface is convex. The fifth lens 150 has a positive refractive power and both surfaces the fifth lens 150 are convex. The sixth lens 160 has a negative refractive power. An object-side surface of the sixth lens 160 is convex and an image-side surface is concave. In addition, inflection points are formed on both surfaces of the sixth lens 160. The seventh lens 170 has a positive refractive power. The object-side surface of the seventh lens 170 is convex and the image-side surface is concave. In addition, inflection points are formed on both surfaces of the seventh lens 170.

Figure 2:
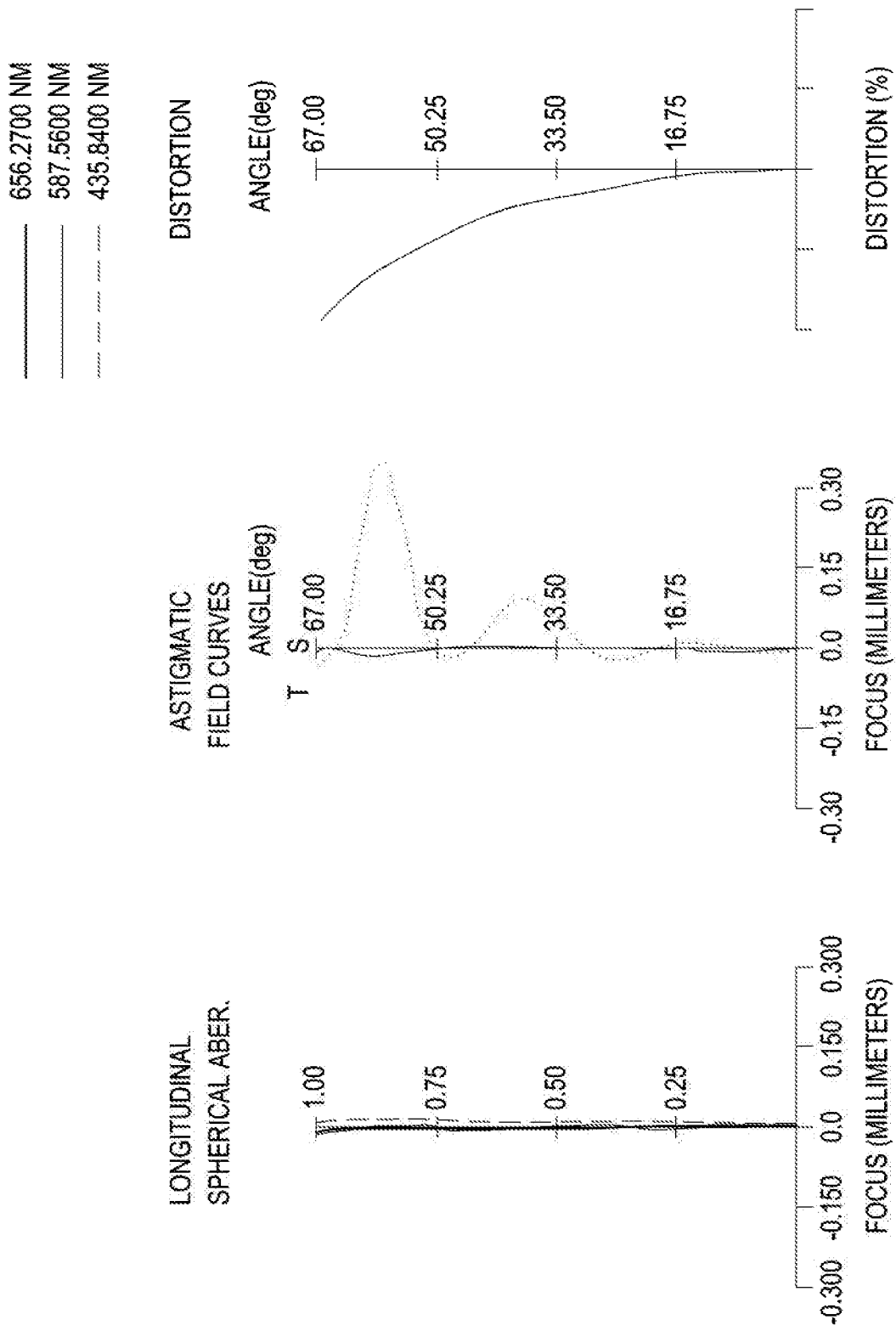
FIG. 2 is a graphical illustration of aberration curves in an example of the optical imaging system illustrated in FIG. 1.

The optical imaging system configured as described above has aberration characteristics as illustrated in FIG. 2. FIGS. 3 and 4 are tables representing characteristics of lenses and aspherical characteristics of the optical imaging system illustrated in FIG. 1.

Figure 5:
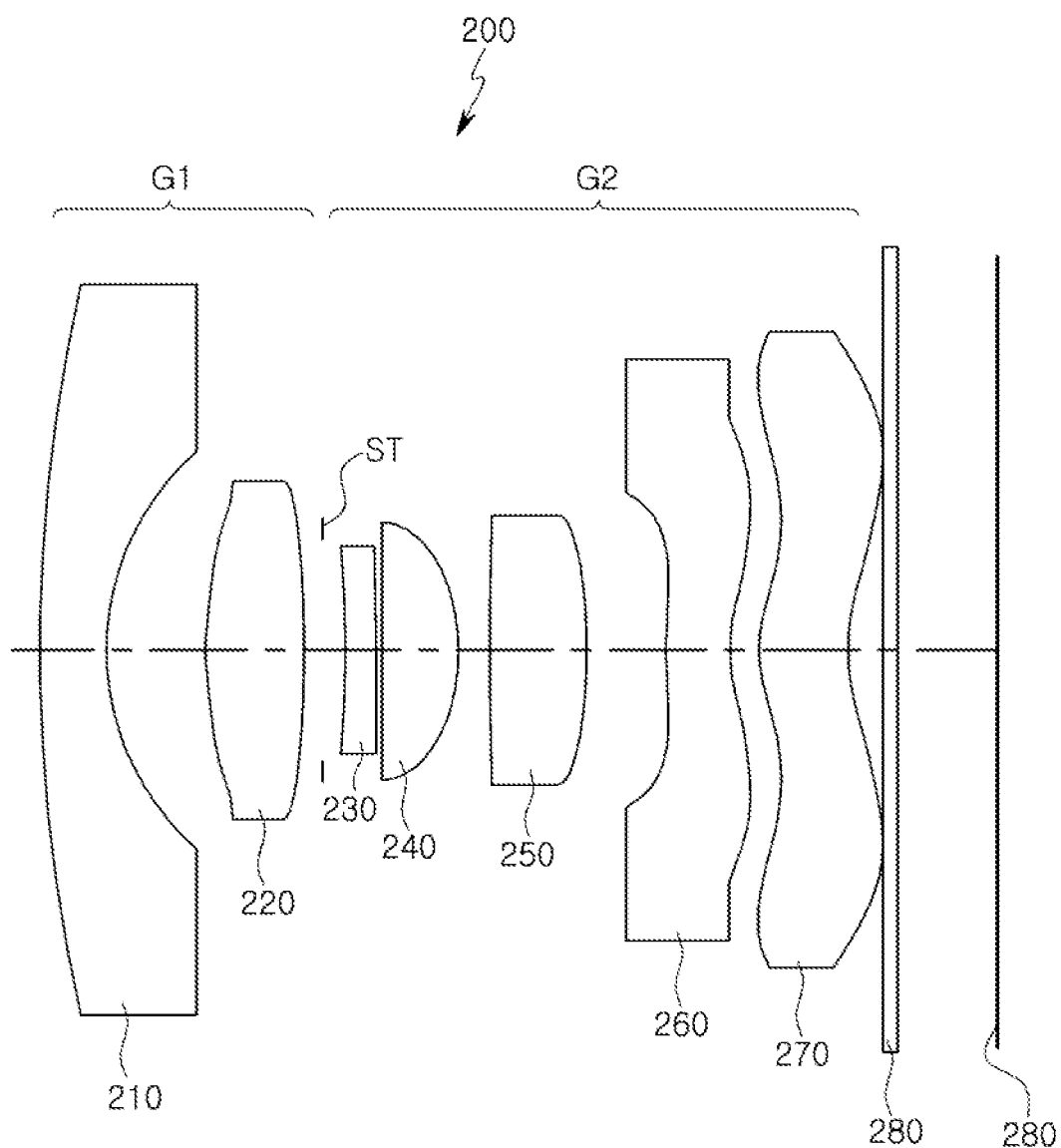
FIG. 5 is a diagram illustrating another example of an optical imaging system.

An optical imaging system according to another embodiment will be described with reference to FIG. 5.

The optical imaging system 200 according to the embodiment includes an optical system having a first lens 210, a second lens 220, a third lens 230, a fourth lens 240, a fifth lens 250, a sixth lens 260, and a seventh lens 270.

The first lens 210 and the second lens 220 form a first lens group G1, and the third to seventh lenses 230 to 270 may form a second lens group G2.

The optical imaging system 200 includes a filter 280, an image sensor 290, and a stop ST. The filter 280 is disposed adjacently to an image-side surface of the seventh lens 270, and the stop ST is disposed between the second lens 220 and the third lens 230.

The first lens 210 has a negative refractive power, and an object-side surface thereof is convex and an image-side surface thereof is concave. The second lens 220 has a positive refractive power, and both surfaces are convex. The third lens 230 has a negative refractive power, and an object-side surface is concave and an image-side surface is convex. The fourth lens 240 has a positive refractive power, and an object-side surface thereof is concave and an image-side surface thereof is convex. The fifth lens 250 has a positive refractive power, and both surfaces thereof are convex. The sixth lens 260 has a negative refractive power, and an object-side surface thereof is convex and an image-side surface thereof is concave. In addition, inflection points are formed on both surfaces of the sixth lens 260. The seventh lens 270 has a positive refractive power, and an object-side surface thereof is convex and an image-side surface thereof is concave. In addition, inflection points are formed on both surfaces of the seventh lens 270.

Figure 6:
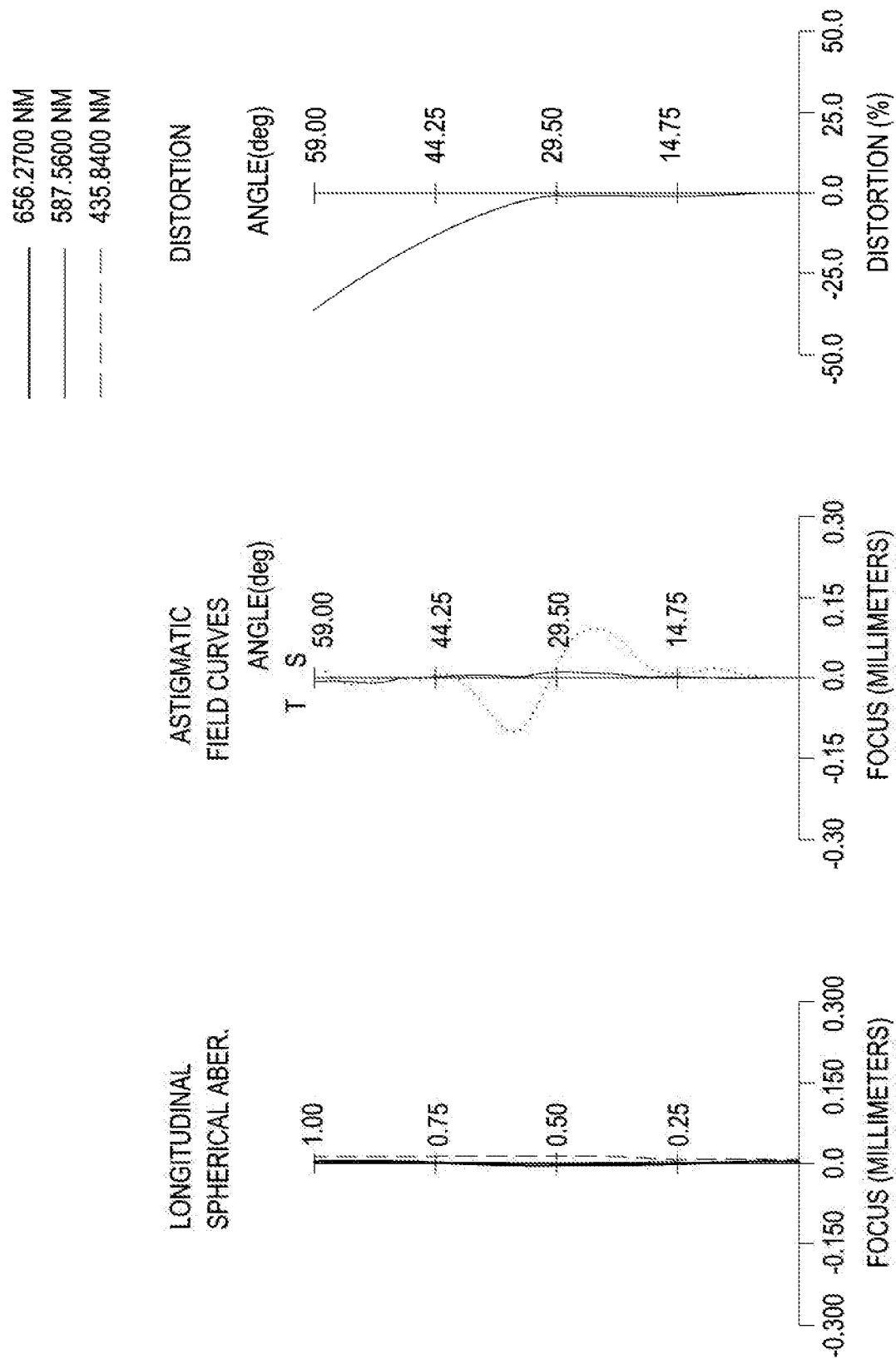
FIG. 6 is a graphical illustration of aberration curves in an example of the optical imaging system illustrated in FIG. 5.

The optical imaging system configured as described above represents aberration characteristics as illustrated in FIG. 6. FIGS. 7 and 8 are tables representing characteristics of lenses and aspherical characteristics of the optical imaging system according to the embodiment illustrated in FIG. 6.

Figure 9:
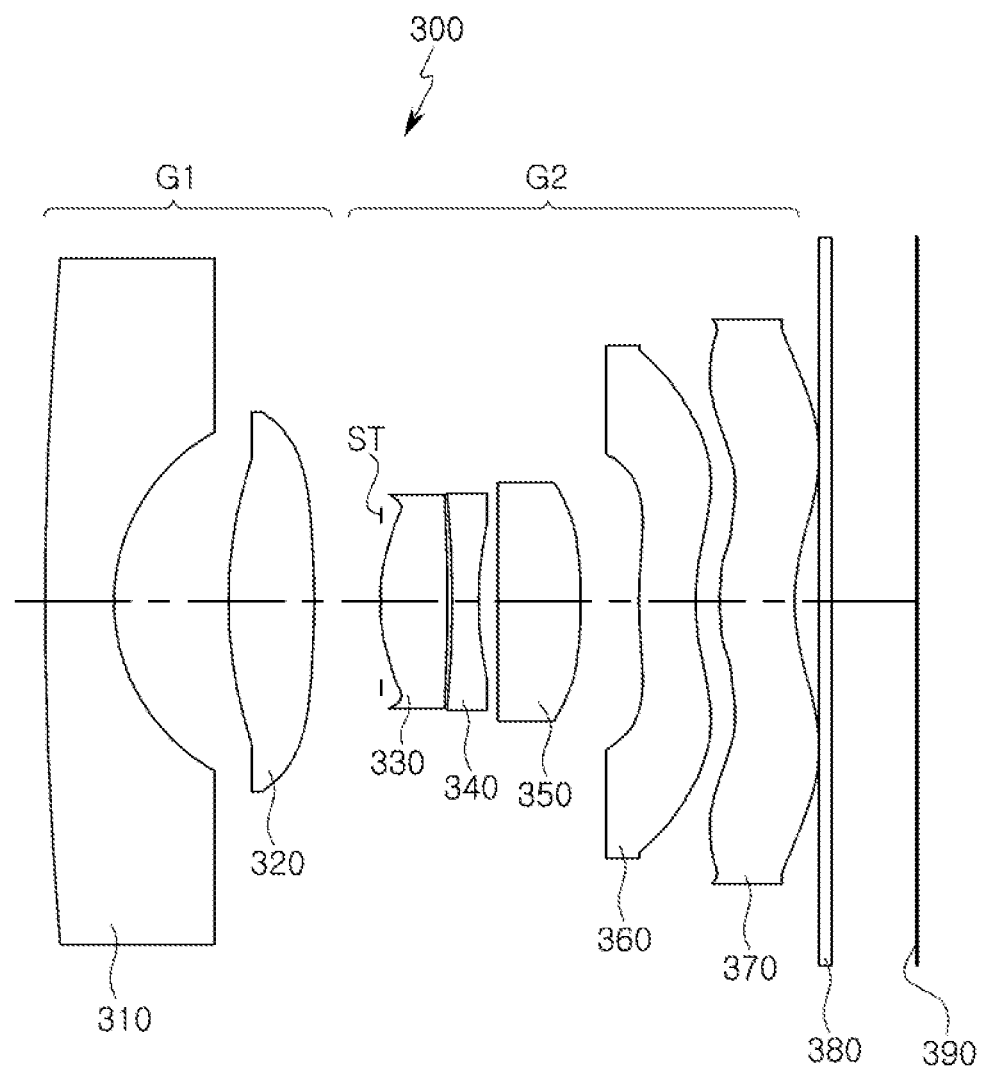
FIG. 9 is a graphical illustration of another example of an optical imaging system.

An optical imaging system according to another embodiment will be described with reference to FIG. 9.

The optical imaging system 300 according to the embodiment includes an optical system including a first lens 310, a second lens 320, a third lens 330, a fourth lens 340, a fifth lens 350, a sixth lens 360, and a seventh lens 370.

In the configuration of the lenses described above, the first lens 310 and the second lens 320 form a first lens group G1, and the third to seventh lenses 330 to 370 form a second lens group G2.

The optical imaging system 300 includes a filter 380, an image sensor 390, and a stop ST. The filter 380 is disposed adjacently to an image-side surface of the seventh lens 370, and the stop ST is disposed between the second lens 320 and the third lens 330.

In the present embodiment, the first lens 310 has a negative refractive power, and an object-side surface thereof is convex and an image-side surface thereof is concave. The second lens 320 has a positive refractive power, and both surfaces thereof are convex. The third lens 330 has a positive refractive power, and both surfaces thereof are convex. The fourth lens 340 has a negative refractive power, and both surfaces thereof are concave. The fifth lens 350 has a positive refractive power, and both surfaces thereof are convex. The sixth lens 360 has a negative refractive power, and an object-side surface thereof is convex and an image-side surface thereof is concave. In addition, inflection points are formed on both surfaces of the sixth lens 360. The seventh lens 370 has a positive refractive power, and an object-side surface thereof is convex and an image-side surface thereof is concave. In addition, inflection points are formed on both surfaces of the seventh lens 370.

Figure 10:
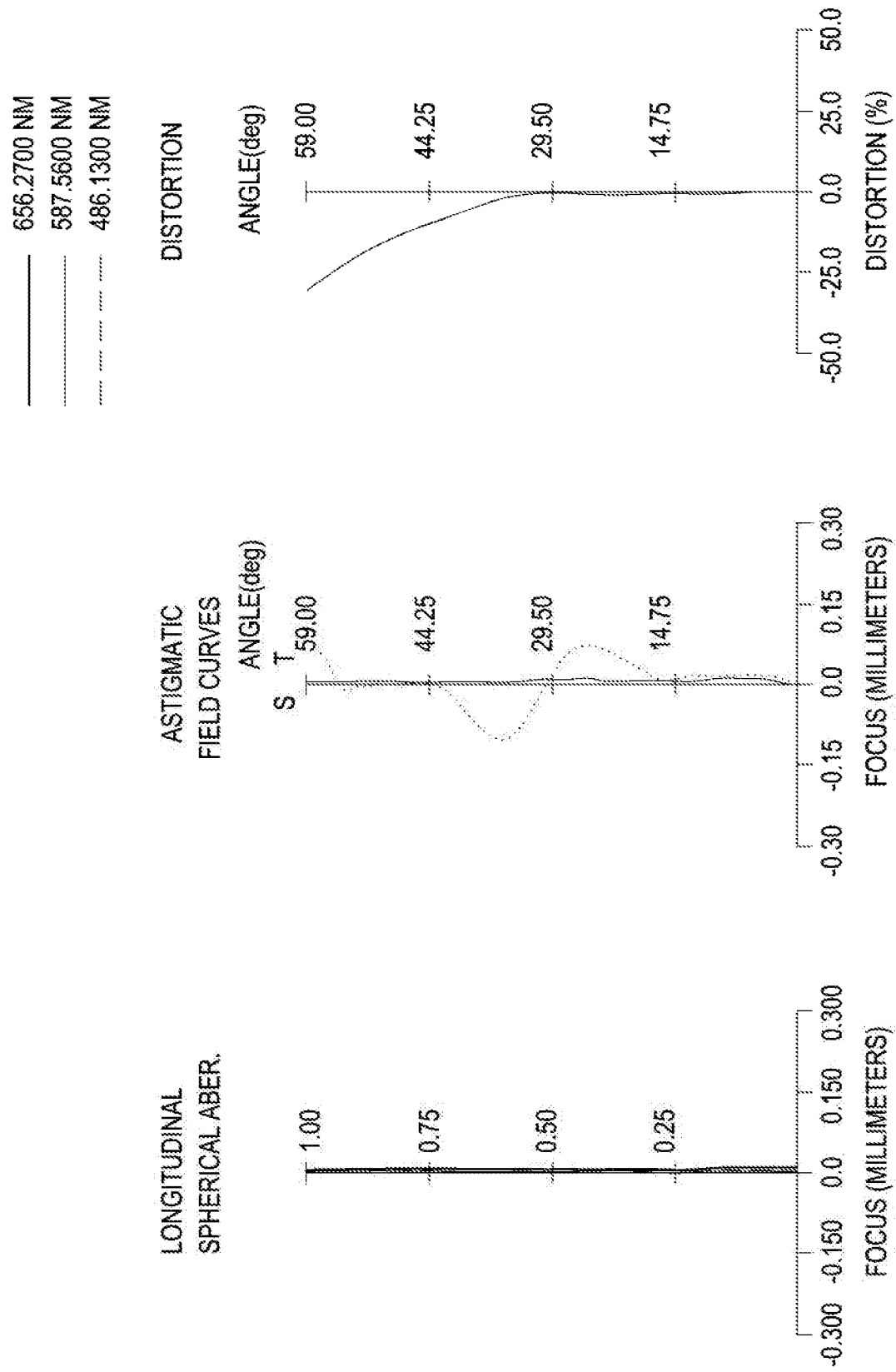
FIG. 10 is a graphical illustration of aberration curves of the optical imaging system illustrated in FIG. 9.

The optical imaging system configured as described above represents aberration characteristics as illustrated in FIG. 10. FIGS. 11 and 12 are tables representing characteristics of lenses and aspherical characteristics of the optical imaging system according to the embodiment illustrated in FIG. 10.

The optical imaging system may be focused, for example, the second lens group G2 may be moved anywhere between the first lens group G1 and an imaging plane 390. Therefore, the distance D1 between the second lens 320 and the third lens 330 may be changed to a number within a range of −0.025 to 0, and a distance D2 between the seventh lens 370 and the imaging plane 390 may be changed to a number within in a range of 0.74 to 0.765.

The optical imaging system configured as described above may perform high resolution photographing by changing a position of the second lens group G2.

Figure 13:
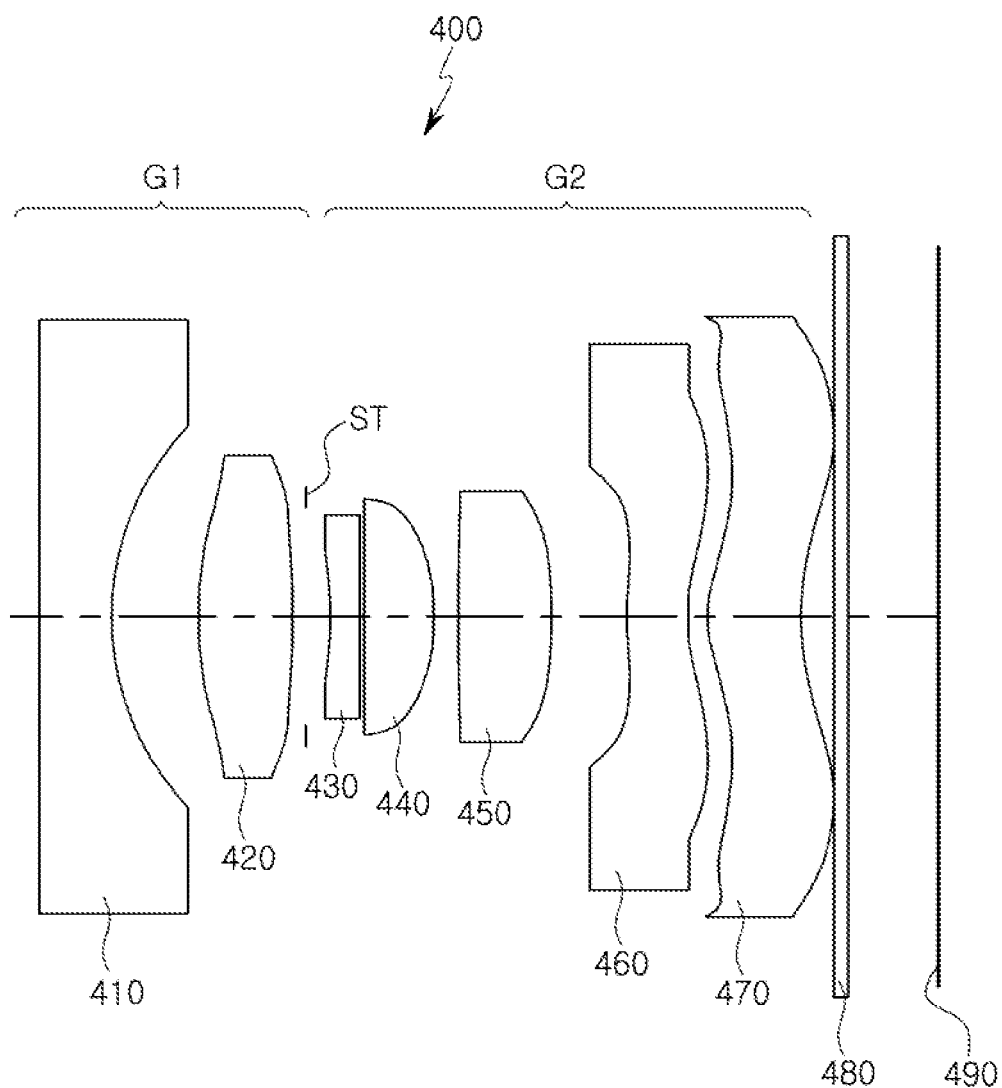
FIG. 13 is a diagram illustrating another example of an optical imaging system.

An optical imaging system according to another embodiment will be described with reference to FIG. 13.

The optical imaging system 400 according to the embodiment includes an optical system including a first lens 410, a second lens 420, a third lens 430, a fourth lens 440, a fifth lens 450, a sixth lens 460, and a seventh lens 470.

In the configuration of the lenses as described above, the first lens 410 and the second lens 420 form a first lens group G1, and the third to seventh lenses 430 to 470 form a second lens group G2.

The optical imaging system 400 includes a filter 480, an image sensor 490, and a stop ST. The filter 480 is disposed adjacently to an image-side surface of the seventh lens 470, and the stop ST is disposed between the second lens 420 and the third lens 430.

In the present embodiment, the first lens 410 has a negative refractive power, and an object-side surface thereof is convex and an image-side surface thereof is concave. The second lens 420 has a positive refractive power, and both surfaces thereof are convex. The third lens 430 has a negative refractive power, and an object-side surface thereof is concave and an image-side surface thereof is convex. The fourth lens 440 has a positive refractive power, and an object-side surface thereof is concave and an image-side surface thereof is convex. The fifth lens 450 has a positive refractive power, and both surfaces thereof are convex. The sixth lens 460 has a negative refractive power, and an object-side surface thereof is convex and an image-side surface thereof is concave. In addition, inflection points are formed on both surfaces of the sixth lens 460. The seventh lens 470 has a positive refractive power, and an object-side surface thereof is convex and an image-side surface thereof is concave. In addition, inflection points are formed on both surfaces of the seventh lens 470.

Figure 14:
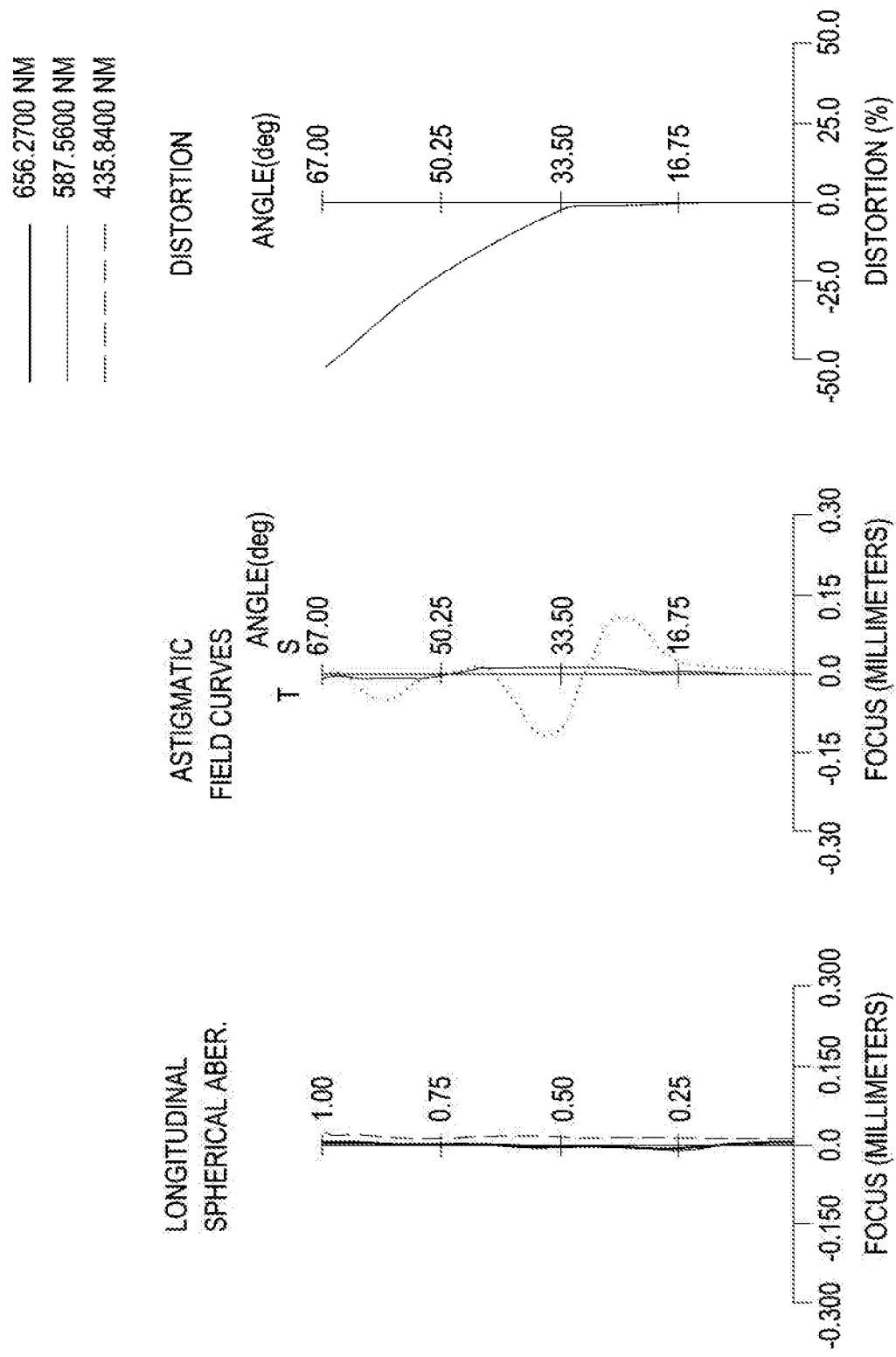
FIG. 14 is a graphical illustration of aberration curves of the optical imaging system illustrated in FIG. 13.

The optical imaging system configured as described above represents aberration characteristics as illustrated in FIG. 14. FIGS. 15 and 16 are tables representing characteristics of lenses and aspherical characteristics of the optical imaging system according to the embodiment illustrated in FIG. 14.

Figure 17:
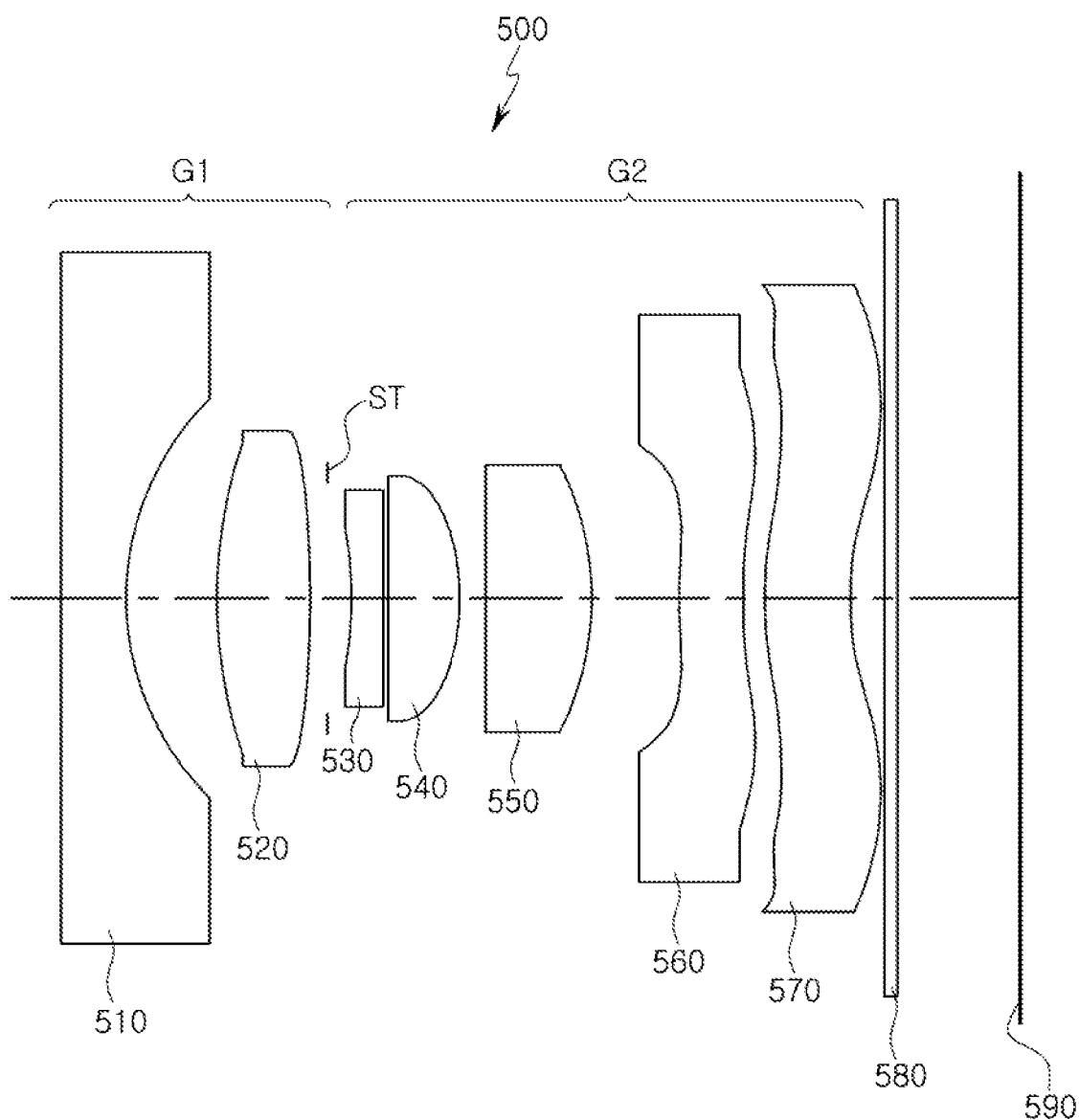
FIG. 17 is a diagram illustrating another example of an optical imaging system.

An optical imaging system according to another embodiment will be described with reference to FIG. 17.

The optical imaging system 500 according to the embodiment includes an optical system including a first lens 510, a second lens 520, a third lens 530, a fourth lens 540, a fifth lens 550, a sixth lens 560, and a seventh lens 570.

In the configurations of the lenses as described above, the first lens 510 and the second lens 520 form a first lens group G1, and the third to seventh lenses 530 to 570 form a second lens group G2.

The optical imaging system 500 includes a filter 580, an image sensor 590, and a stop ST. The filter 580 is disposed adjacently to an image-side surface of the seventh lens 570, and the stop ST is disposed between the second lens 520 and the third lens 530.

In the present embodiment, the first lens 510 has a negative refractive power, and both surfaces thereof are concave. The second lens 520 has a positive refractive power, and both surfaces thereof are convex. The third lens 530 has a negative refractive power, and an object-side surface thereof is concave and an image-side surface thereof is convex. The fourth lens 540 has a positive refractive power, and an object-side surface thereof is concave and an image-side surface thereof is convex. The fifth lens 550 has a positive refractive power, and both surfaces thereof are convex. The sixth lens 560 has a negative refractive power, and an object-side surface thereof is convex and an image-side surface thereof is concave. In addition, inflection points are formed on both surfaces of the sixth lens 560. The seventh lens 570 has a negative refractive power, and an object-side surface thereof is convex and an image-side surface thereof is concave. In addition, inflection points are formed on both surfaces of the seventh lens 570.

Figure 18:
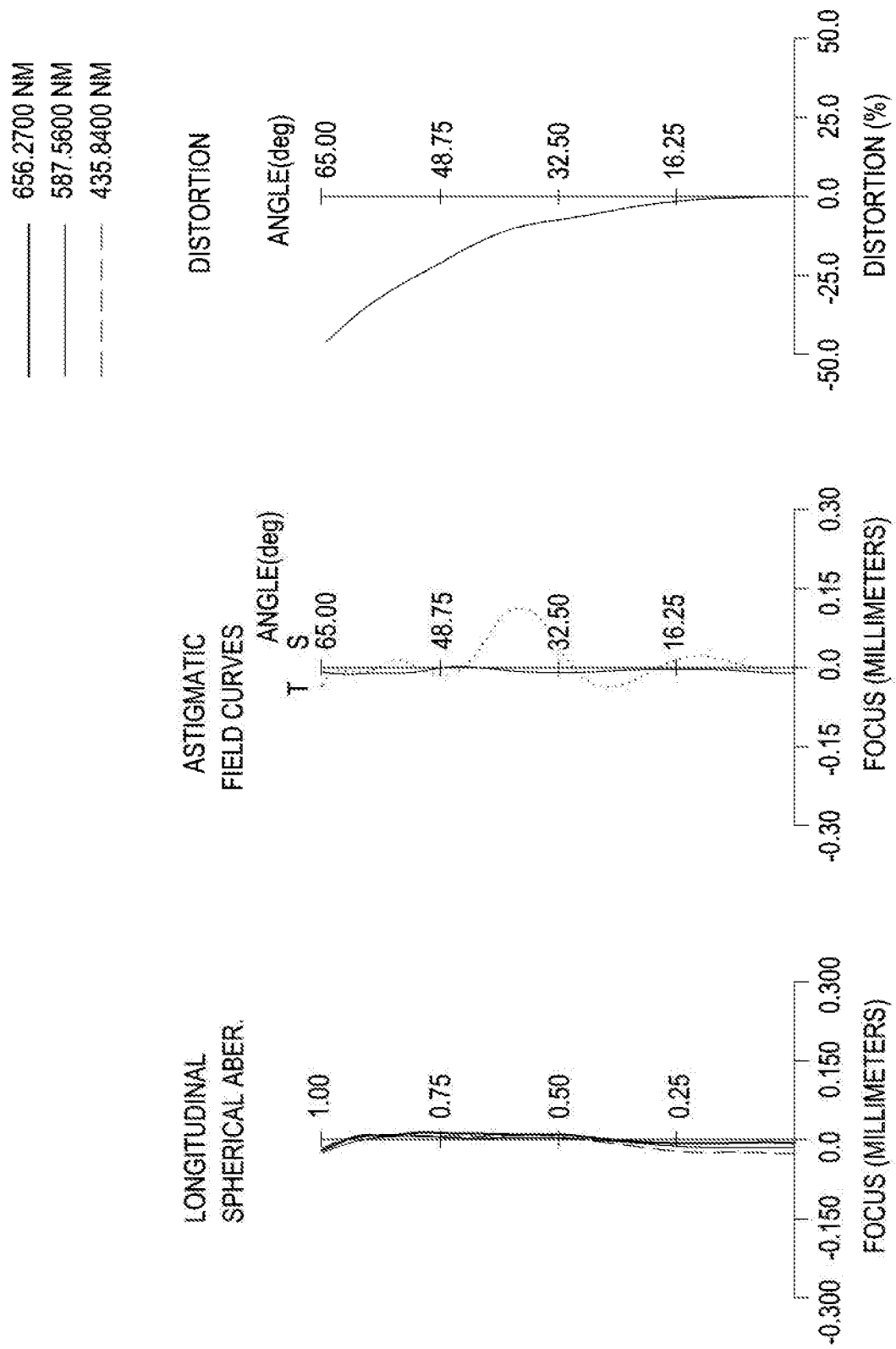
FIG. 18 is a graphical illustration of aberration curves of the optical imaging system illustrated in FIG. 17.

The optical imaging system configured as described above represents aberration characteristics as illustrated in FIG. 18. FIGS. 19 and 20 are tables representing characteristics of lenses and aspherical characteristics of the optical imaging system according to the embodiment illustrated in FIG. 18.

A half of a field of view of each of the optical imaging systems according to the first to fifth embodiments may be substantially 59 degrees or more. Therefore, the optical imaging system according to the present disclosure is useful for a device requiring a wide field of view, such as a monitoring camera for an unmanned aerial vehicle or a monitoring camera for a vehicle.

Table 1 represents values of Conditional Expressions of the optical imaging systems according to the first to fifth embodiments.

TABLE 1

| Conditional Expression | First Exemplary Embodiment | Second Exemplary Embodiment | Third Exemplary Embodiment | Fourth Exemplary Embodiment | Fifth Exemplary Embodiment |
| --- | --- | --- | --- | --- | --- |
| $\{(1/f) * (Y/\tan\theta) - 1\} * 100$ | −47.70 | −36.30 | −30.20 | −53.30 | −46.80 |
| $\tan\theta$ | 2.356 | 1.678 | 1.664 | 2.356 | 2.145 |
| TL/2Y | 1.260 | 1.220 | 1.210 | 1.220 | 1.160 |
| R2/f | 0.860 | 0.880 | 0.730 | 0.990 | 0.950 |
| f/f1 | −0.640 | −0.580 | −0.760 | −0.590 | −0.730 |
| f/f2 | 0.540 | 0.560 | 0.560 | 0.540 | 0.590 |
| f/EPD | 2.990 | 3.160 | 2.760 | 2.960 | 3.160 |
| f/fG2 | 0.700 | 0.790 | 0.780 | 0.810 | 0.820 |

As set forth above, according to the embodiments, an optical imaging system capable of being mounted in a small terminal and having a high level of resolution is realized.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. optical imaging system comprising:
a first lens group comprising a first lens and a second lens; and
a second lens group comprising a third lens, a fourth lens, a fifth lens, a sixth lens, and a seventh lens,
wherein the second lens comprises a positive refractive power,
an object-side surface of the third lens is concave in a paraxial region,
an object-side surface of the fourth lens is concave in a paraxial region,
the first to seventh lenses are sequentially disposed from an object side toward an imaging plane, and
TTL/2Y<1.3 is satisfied, where TTL is a distance from an object-side surface of the first lens to the imaging plane, and 2Y is a diagonal length of the imaging plane.

2. The optical imaging system of claim 1, wherein the second lens group is movable in an optical axis direction.

3. The optical imaging system of claim 1, wherein the first lens has a negative refractive power.

4. The optical imaging system of claim 1, wherein the third lens has a negative refractive power.

5. The optical imaging system of claim 1, wherein the fourth lens has a positive refractive power.

6. The optical imaging system of claim 1, wherein the fifth lens has a positive refractive power.

7. The optical imaging system of claim 1, wherein the sixth lens has a negative refractive power.

8. The optical imaging system of claim 1, wherein the seventh lens has a positive refractive power.

9. The optical imaging system of claim 1, wherein $-80 < \{(1/f)*(Y/\tan\theta)-1\}*100 < -20$ is satisfied, where f is an overall focal length of the optical imaging system, Y is ½ of a diagonal length of the imaging plane, and $\theta$ is a half of a field of view of the optical imaging system.

10. The optical imaging system of claim 1, wherein $1.0 < \tan\theta < 4.0$ is satisfied, where $\theta$ is a half of a field of view of the optical imaging system.

11. The optical imaging system of claim 1, wherein $0.4 < R2/f < 1.5$ is satisfied, where f is an overall focal length of the optical imaging system, and R2 is a radius of curvature of an image-side surface of the first lens.

12. The optical imaging system of claim 1, wherein $-1.5 < f/f1 < -0.05$ is satisfied, where f is an overall focal length of the optical imaging system, and f1 is a focal length of the first lens.

13. The optical imaging system of claim 1, wherein $0.3 < f/f2 < 0.8$ is satisfied, where f is an overall focal length of the optical imaging system, and f2 is a focal length of the second lens.

14. An optical imaging system comprising:
a first lens having a negative refractive power;
a second lens having a positive refractive power;
a third lens having a refractive power, wherein an object-side surface of the third lens is concave;
a fourth lens having a refractive power, wherein an object-side surface of the fourth lens is concave;
a fifth lens having positive a refractive power;
a sixth lens having a negative refractive power, and an object-side surface thereof being convex; and
a seventh lens having a refractive power and having an inflection point formed on an image-side surface thereof,
wherein the first to seventh lenses are sequentially disposed from an object side toward an imaging plane.

15. The optical imaging system of claim 14, wherein both surfaces of the second lens are convex.

16. An optical imaging system comprising:
a first and second lens groups, the first and second lens groups being sequentially disposed from an object side toward an imaging plane, the first lens group being fixedly disposed at the object-side, and the second lens group being slidably disposed relative to the first group,
wherein the first lens group comprises a first lens and a second lens, and the first and second lenses are sequentially disposed from an object side toward an imaging plane;
wherein the second lens group comprises a third lens, a fourth lens, a fifth lens, a sixth lens, and a seventh lens, and the first to seventh lenses are sequentially disposed from an object side toward an imaging plane;
wherein an object-side surface of the third lens is concave,
wherein an object-side surface of the fourth lens is concave,
wherein the optical imaging system satisfies $0.4 < f/fG2 < 1.1$, where f is an overall focal length of the optical imaging system and fG2 is a synthetic focal length of the second lens group.

17. The optical imaging system of claim 16, wherein the optical imaging system satisfies $-80 < \{(1/f)*(Y/\tan\theta)-1\}*100 < -20$, where f is an overall focal length of the optical imaging system, 2Y is a diagonal length of the imaging plane, and $\theta$ is half of a field of view of the optical imaging system.

* * * * *